(12) United States Patent
Gusmorino et al.

(10) Patent No.: US 7,199,802 B2
(45) Date of Patent: Apr. 3, 2007

(54) MULTIPLE-MODE WINDOW PRESENTATION SYSTEM AND PROCESS

(75) Inventors: Paul Gusmorino, Seattle, WA (US); Jenny Lam, Seattle, WA (US); Mark Ligameri, Snohomish, WA (US); Greg Melander, Redmond, WA (US); Kam VedBrat, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 10/693,678

(22) Filed: Oct. 24, 2003

(65) Prior Publication Data

US 2005/0091608 A1 Apr. 28, 2005

(51) Int. Cl.
*G06T 15/00* (2006.01)
(52) U.S. Cl. .................. 345/589; 715/764; 715/866
(58) Field of Classification Search ................ 345/589, 345/619; 715/764, 800, 866
See application file for complete search history.

(56) References Cited

U.S. PATENT DOCUMENTS 6,141,008 A * 10/2000 Bloomfield ................. 715/800
6,201,539 B1 * 3/2001 Miller et al. ................. 715/866
6,741,266 B1 * 5/2004 Kamiwada et al. ......... 715/768

* cited by examiner

*Primary Examiner*—Phu K. Nguyen
(74) *Attorney, Agent, or Firm*—Lyon & Harr, LLP; Richard T. Lyon

(57) ABSTRACT

A system and process for managing the presentation of windows on the display screen of a computing device is presented. In general, this is a multiple-mode window presentation system and process that displays one or more of the peripheral graphic user interface (GUI) elements typically displayed on the display screen in addition to a window, such as the frame and title bar of the window and any task bar or side bar, in a first appearance mode when the window is maximized. However, when the window is displayed in a less-than-maximized size, one or more of the peripheral GUI elements are displayed in a second appearance mode which is substantially different from the first. In general the second appearance mode is designed to attract the attention of a user to the peripheral GUI elements, while the first mode is designed to avoid distracting the user from the content of the maximized window.

10 Claims, 5 Drawing Sheets
(3 of 5 Drawing Sheet(s) Filed in Color)

MULTIPLE-MODE WINDOW PRESENTATION SYSTEM AND PROCESS

BACKGROUND

1. Technical Field

The invention is related to displaying windows on a computing device's display screen, and more particularly to a multiple-mode window presentation system and process that displays one or more of the peripheral graphic user interface (GUI) elements in a first appearance mode when a window is maximized and displays one or more of these peripheral GUI elements in a second appearance mode when the window is displayed in a less-than maximized size within the display screen. The second appearance mode is substantially different from the first appearance mode, and in preferred embodiments the second appearance mode is designed to attract the attention of a user, while the first appearance mode is design to avoid distracting the user's attention from the content of the window.

2. Background Art

A window is a viewing area presented on a computing device's display screen typically employed in a multitasking operating system that allows more than one of such viewing areas to be displayed on the screen at any one time as part of a graphical user interface (GUI). In essence windows are employed by a computer program to interface with the user. In this way the user can interact with any of the currently displayed windows, usually by placing the screen cursor over the window and selecting portions of it, such as an icon or button. One such interaction involves the user resizing a currently displayed window. For example, it can be stretched on any side, minimized, maximized, restored and closed. In regard to restoring a window, this generally refers to a resizing of the window to a smaller viewing area in response to a user entering a restore command (e.g., by selecting a restore button in the window) when the window is maximized in the display screen. This smaller size is typically the default size the window is displayed at when first opened. Thus, the term restore was coined in reference to restoring the window to its former size. The restore term has also come to generally refer to any less-than-maximized window size, regardless of if it has been first opened or downsized from its maximum size.

Typically, windows are rendered and managed by a rendering system (which can be a so-called "windows manger" program) as part of a "windowing system" such as Microsoft Corporation's Windows® operating system. A window manager is the computer program responsible for coordinating all the windows currently displayed on the screen. Specifically, a window manager program handles among other things how all of the windows created by various applications that share the screen are displayed. Thus it is the window manager that determines the size, position and stacking order for each window displayed on the screen. This is based on both the requirements of the computer program associated with the window and user inputs. It is also the job of the window manager to create a frame, including a title bar, around the displayed windows. The frame essentially defines the boundaries of the window on the screen. In general, this frame falls under the category of peripheral GUI elements displayed on the display screen of the computing device. The window manager program can further generate a task bar, which includes among other things indicator bars that identify the windows currently opened and available to the user. The task bar is typically displayed at the bottom of the display screen, although it is not unknown to display it elsewhere such as along one side of the screen. The task bar is another example of a peripheral GUI element.

A problem with current window manager programs is that the appearance of a maximized window is very similar to the same window when displayed in a default or restored size. For example, the only visible difference between the frame of a maximized window in most windowing systems and the frame of a restored window, is the glyph that appears in a minimize/restore button in the window's title bar. When the window is maximized, a restore glyph appears on the button, and when the window exhibits its restored size, a maximize glyph appears on the button. In the case of the task bar, there is often no difference in its appearance at all, regardless of whether a window is maximized or exhibits its restored size.

The similarity between the appearance of maximized and restored windows is a source of confusion and consternation for users. First, it is difficult for the user to readily differentiate between maximized and restored windows in those instances where the maximized size of a window does not fill the entire display screen. For example, a user may want to work with a window and have it as big as possible for this purpose. In current systems, the user would have to find the minimize/restore button in the window (if present) and identify which glyph is being displayed. As the button and glyphs can be quite small this can be an irksome task.

Secondly, when a user maximizes a window it is an indication that he or she wants to focus on the content of that window. Thus, extraneous objects displayed on the periphery of the window, such as in the frame and task bar may constitute a distraction that takes the users attention away from the content of the window. For example, the window frames and the task bar added by current window manager programs are often designed to be eye-catching and aesthetically pleasing. This may be fine when the user is not interested in concentrating on the content of a window. However, when a user does want to attend to a window, the window frame and task bar appearance can distract the user, all the more so in that they are designed to attract the user's attention. Thus, what may be desirable for a window when in the restored size, can become a distraction when the window is maximized. However, this is what happens with current window manager programs since the window frames and task bar appearances are not generally changed when the window is resized.

SUMMARY

The present invention is directed toward a system and process for managing the presentation of windows on the display screen of a computing device that avoids the aforementioned problems of current window manager programs. In general, the present invention is a multiple-mode window presentation system and process that displays one or more of the peripheral graphic user interface (GUI) elements displayed on the display screen in addition to a window, such as the frame and title bar of the window and any task bar or side bar, in a first appearance mode when the window is maximized. However, when the window is displayed in a less-than-maximized size, one or more of the peripheral GUI elements are displayed in a second appearance mode which is substantially different from the first. In a preferred embodiment of the present system and process, the second appearance mode is designed to attract the attention of a user to the peripheral GUI elements, while the first mode is designed to avoid distracting the user from the content of the maximized window. In this way, in the first appearance mode, the user's attention is focused on the content of the window rather than the peripheral GUI elements. However, when the window is first opened or restored, or otherwise exhibits a size that is less than its maximized size, the peripheral GUI elements are displayed so as to exhibit an appearance that attracts a user's attention to the peripheral GUI elements.

The foregoing change in the appearance of the peripheral GUI elements has some distinct advantages. When a user maximizes a window, it is likely that he or she intends to attend to the contents displayed in that window and does not want to be distracted by extraneous item displayed outside the window. Changing the appearance of one or more of the peripheral GUI elements when a window is maximized to one that de-emphasizes them, reduces the chance that the user will be distracted from the content of the window. In addition, the change helps the user differentiate between a maximized window and a restored window, without having to find the aforementioned minimize/restore button in those cases where the maximized window does not take up the entire display screen. Conversely, when a window is not maximized this is an indication that the user may not be actively working with that window. Thus, displaying the peripheral GUI element with a visually interesting appearance that attracts the attention of the user is appropriate and desired.

The appearance of the aforementioned peripheral GUI elements can be de-emphasized is several way. For example, in one new window presentation scheme the peripheral GUI elements appear to have a degree of transparency so the user can see a portion of whatever image is displayed in the background of the display screen through the GUI elements. While this look is visually enticing, it could become a distraction when the user wants to concentrate on the content of a window. Thus, one preferred way of de-emphasizing the appearance of the peripheral GUI elements is to make them opaque, or at least substantially opaque, meaning that the underlying imagery is either completely or substantially blocked from being viewed through these GUI elements. Another way is to change the background color of the elements to something that is less eye-catching than the maximized window's content. For example, the color black is a good choice, although not the only one. Yet another way to de-emphasize the appearance of the peripheral GUI elements is to change the color of any lettering or graphics contained in the elements to something that does not draw attention, but which can still be read. In tested embodiments of the present system and process the color white was chosen with good results. However, white is not he only choice that would accomplish the intended purpose. Further, peripheral GUI elements often included control buttons, indicator bars and the like. These items are often brightly colored and textured to draw the attention of the user to them. Thus, to de-emphasize such items, the color and texture can be changed to something more nondescript. In tested embodiments these items were displayed in an opaque grey; however other non-obtrusive colors and textures could be chosen as well. Still another example of way in which the appearance of the frame surrounding a window can be de-emphasized when the window is maximized involves simply eliminating it with the exception of the portion containing the title bar as this may be helpful to the user.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

The file of this patent contains at least one drawing executed in color. Copies of this patent with color drawing (s) will be provided by the U.S. Patent and Trademark Office upon request and payment of the necessary fee.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
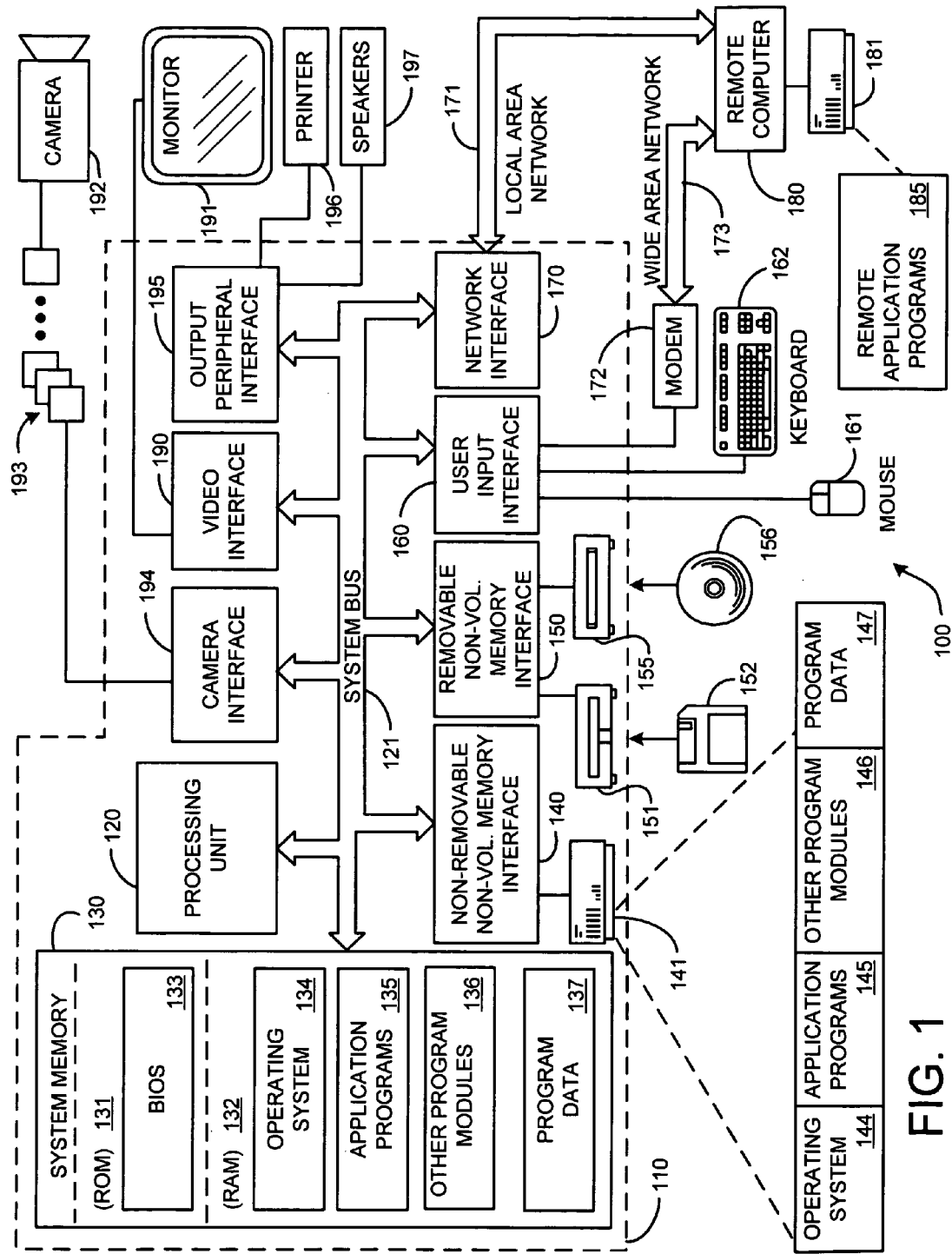
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) Local Bus, and Peripheral Component Interconnect (PCI) Bus Also Known as Mezzanine Bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

2.0 The Multiple-Mode Window Presentation System and Process

The exemplary operating environment having now been discussed, the remaining part of this description section will be devoted to a description of the program modules embodying the invention. Generally, the system and process according to the present invention involves providing a graphical user interface (GUI) that includes a multiple-mode window presentation scheme. In this scheme, when a window is maximized, any peripheral GUI elements, such as the window's frame and title bar, a task bar, and/or a side bar, are displayed within the display screen in a manner that is substantially different from the way they are displayed when the window is not maximized. In a preferred embodiment this entails displaying the peripheral GUI elements so as to de-emphasize them when a window is maximized, thereby concentrating the user's attention on the content of the window. However, when the window is resized to occupy a smaller viewing area on the screen, such as when it is restored to a default (i.e., restored) size, or when it is initially displayed in a less than maximum size, it is displayed such that the peripheral GUI elements exhibit their default appearance. This default appearance is in general designed to make the peripheral GUI element stand out to attract the user's attention. De-emphasizing the appearance of peripheral GUI elements when a window is maximized reduces distractions, and helps users focus on the content of the window. In addition, the de-emphasizing changes helps the user differentiate between a maximized window and a restored window in cases where the maximized window does not take up the entire display screen.

Figure 2:
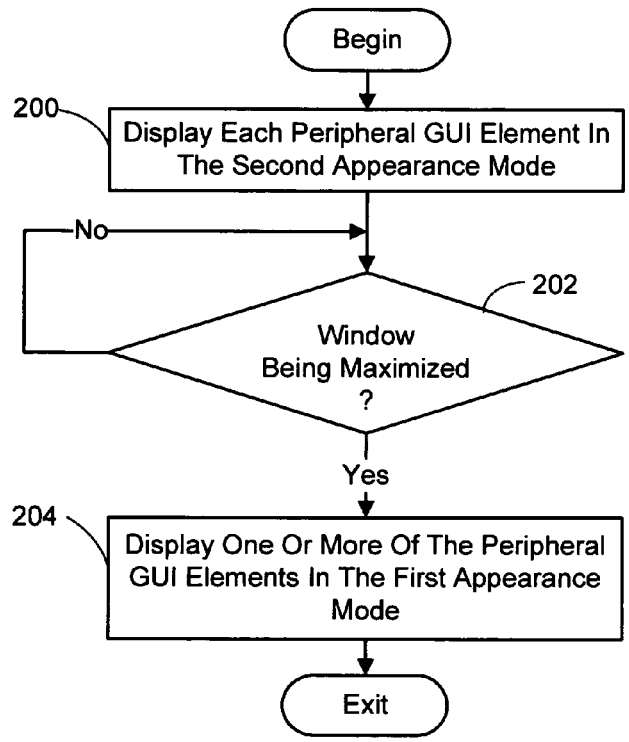
FIG. 2 is a flow chart diagramming a process for managing the presentation of windows on the display screen of a computing device in accordance with the present invention in a situation where a window starts out being displayed in a less-than-maximized size.
Figure 3:
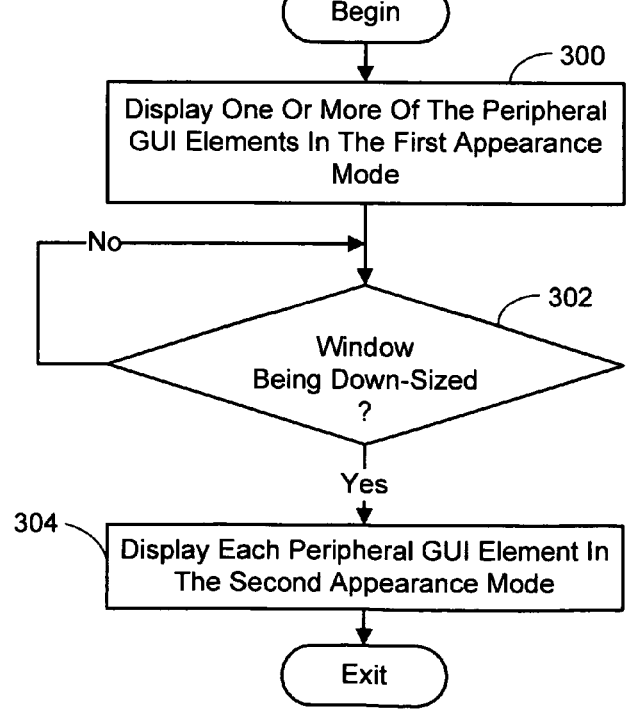
FIG. 3 is a flow chart diagramming a process for managing the presentation of windows on the display screen of a computing device in accordance with the present invention in a situation where a window starts out being displayed in its maximized size.

Thus, referring to the flow diagram in FIG. 2, in a situation where a window starts out being displayed in a less-than-maximized size on a display screen, the present system and process generally involves first displaying one or more peripheral GUI elements in the aforementioned second appearance mode (process action 200). It is then ascertained if the window is to be maximized within the display screen (process action 202). If not, no action is taken. However, if the window is to be maximized, then in process action 204, one or more of the peripheral GUI elements are displayed in the aforementioned first appearance mode. Conversely, referring to the flow diagram in FIG. 3, in a situation where a window starts out being displayed in its maximized size, the present system and process generally involves first displaying one or more of the peripheral GUI elements in the aforementioned first appearance mode (process action 300). It is then ascertained if the window is to be down-sized within the display screen (process action 302). If not, no action is taken. However, if the window is to be down-sized, then in process action 304, one or more of the peripheral GUI elements are displayed in the aforementioned second appearance mode.

Figure 4:
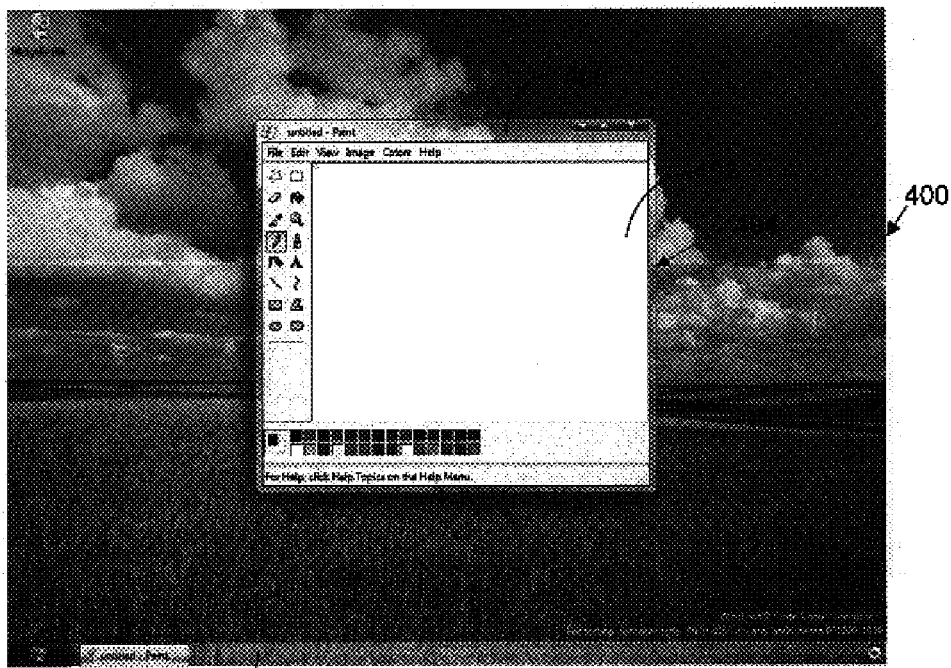
FIG. 4 is an image of a display screen showing a window in its restored size against a background, where the frame of the window and the task bar at the bottom of the screen have the appearance of being somewhat transparent a visually stunning look that attracts the attention of a user.

More particularly, when a window is opened a window manager program typically generates a frame around the window that includes a title bar. As described previously the window is often opened exhibiting a default size referred to as the restored size. In addition, as explained previously, the window frame is often designed so as to attract the attention of the user to the window. The window frame is one example of the aforementioned peripheral GUI elements. An example of a viewing space 400 of a computing device's display screen with such a window 402 displayed, is shown in FIG. 4. In this example, the window 402 is shown in its default or restored size in the middle of the viewing space 400. As can be seen the window 402 takes up much less than the entire viewing area available. In the example shown in FIG. 4, the viewing space 400 surrounding the window is dominated by a landscape scene that appears to the user as if he or she is looking out over a field toward the horizon. In this example, the window 402 is the default window displayed when Microsoft Corporation's Paint™ drawing tool program is first activated. Note that the window 402 is surrounded by a frame 404, including a title bar 406 that features an appearance which looks like it is made of glass. This appearance and the details of how it is generated are the subject of a co-pending U.S. patent application entitled "COMPOSITING DESKTOP WINDOW MANAGER", which was filed on Oct. 23, 2003 and assigned Ser. No. 10/691,450. The subject matter of this co-pending application is hereby incorporated by reference.

The at least partially transparent appearance of the frame 404 and title bar 406 allows the user to see a portion of the background scene through the frame and bar. However, if the user is interacting with the window 400, the frame 404 and title bar 406 would likely distract the user from the content of the window. Also note that the task bar 408 shown at the bottom of the viewing screen has the same transparent appearance. The task bar is another example of the aforementioned peripheral GUI elements.

Figure 5:
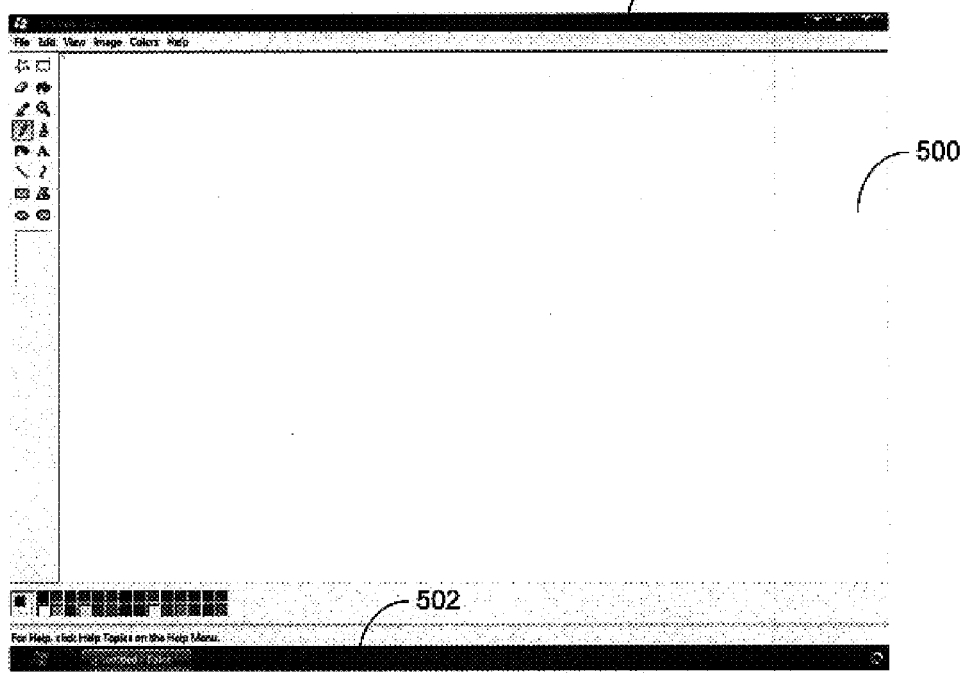
FIG. 5 is an image of a display screen showing the window of FIG. 4 maximized within the display screen, where all but the title bar of the window's frame has been eliminated, and where the title bar and the task bar have been de-emphasized so as to not draw the attention of the user away from the content of the window.

When a user maximizes a window within the viewing space, he or she usually does so to concentrate on working with the content of the window. Thus, the default appearance of the peripheral GUI elements, such as the window's frame and title bar, and the task bar, can divert the user's attention away from the window's content. To avoid this, the appearance of the maximized window is changed to de-emphasize the peripheral GUI elements as indicated previously. This can be accomplished in a variety of ways. Referring to FIG. 5, some possible de-emphasizing appearance changes will now be described. In this figure the window 500 shown in its restored size in FIG. 4 has been maximized to cover the entire viewing area of the computing device's display screen, with the exception of the region occupied by the task bar 502. First note that the frame has been modified such that the sides and bottom have been eliminated and the background of the title bar 504 has been changed to appear opaque and black in color. Similarly, the background of the task bar 502 has also been changed to be opaque and black. It should be noted that in some GUI environments the task bar can be optionally hidden from view. If such a feature is implemented and a window in maximized in the viewing space, then the maximized window would simply extend into the space that would have been occupied by the task bar. If, while the window is activated, the user causes the task bar to reappear on the screen, it would exhibit the aforementioned de-emphasized appearance.

Eliminating the sides and bottom portions of the window frame completely removes the possibility they could cause a distraction. However, as an alternative the sides and bottom of the frame could be retained but changed to the substantially opaque black color as well. The color black was employed in the depicted example as blacked out portions of the screen tend to be ignored by a viewer. Of course, while the use of black as the background color for the de-emphasized peripheral GUI elements has the foregoing advantages, it is not intended to limit the present invention to that color. Rather other colors or patterns that tend to be non-distracting to a user can be used instead. The key is to render the peripheral GUI element so as to minimize their attention getting appearance, not to restrict the de-emphasizing process to a specific background color or pattern.

Referring once again to FIG. 5, in addition to making the background of the peripheral GUI elements substantially opaque and black, the text and other graphics associated with these elements can also be de-emphasized. As shown in the example screen of FIG. 5, the lettering and graphics of the task and title bars 502, 504 have been changed to a white color. Another way to de-emphasize any lettering and graphics would be to dim it by reducing the brightness in comparison to the level employed when the window is not maximized. Further, the control buttons, indicator bars, and the like, of the task and title bars 502, 504 have been de-emphasized by changing their color—in this case from an eye-catching somewhat transparent silver to a nondescript opaque gray. Here again, it is not imperative that the specific colors chosen for the lettering, graphics, control buttons, indicator bars and other sub-items of the peripheral GUI elements items in the example are employed. Rather any color that tends to de-emphasize these items can be used as desired.

Figure 6:
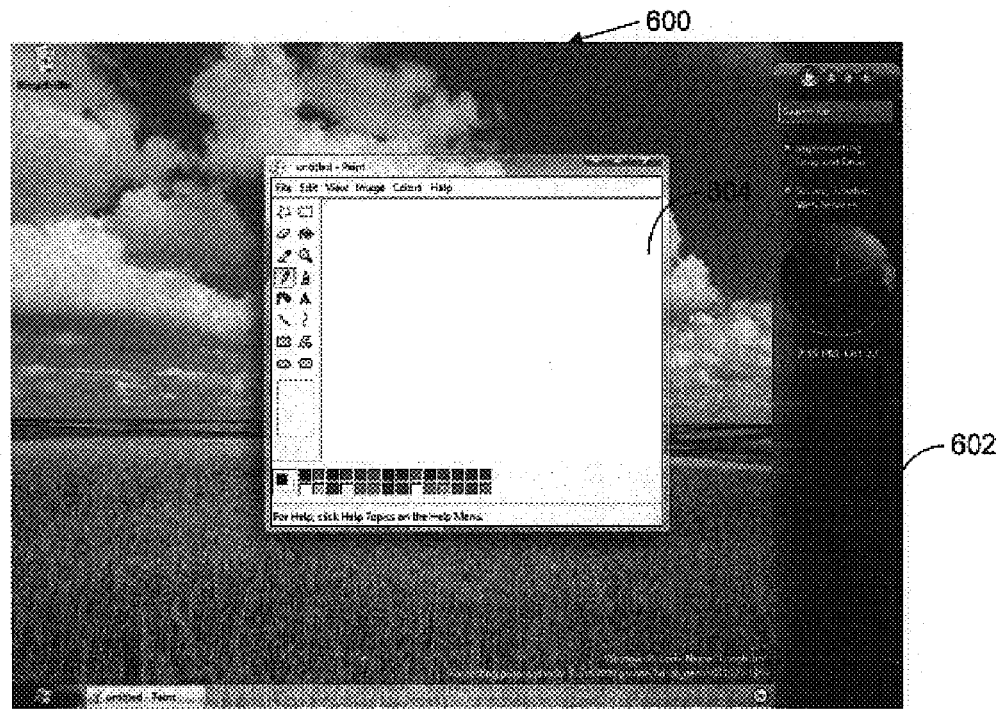
FIG. 6 is an image of a display screen showing the window of FIG. 4 in its restored size, where not only do the frame of the window and the task bar have the appearance of being somewhat transparent, but also a side bar shown on the right hand side of the screen.
Figure 7:
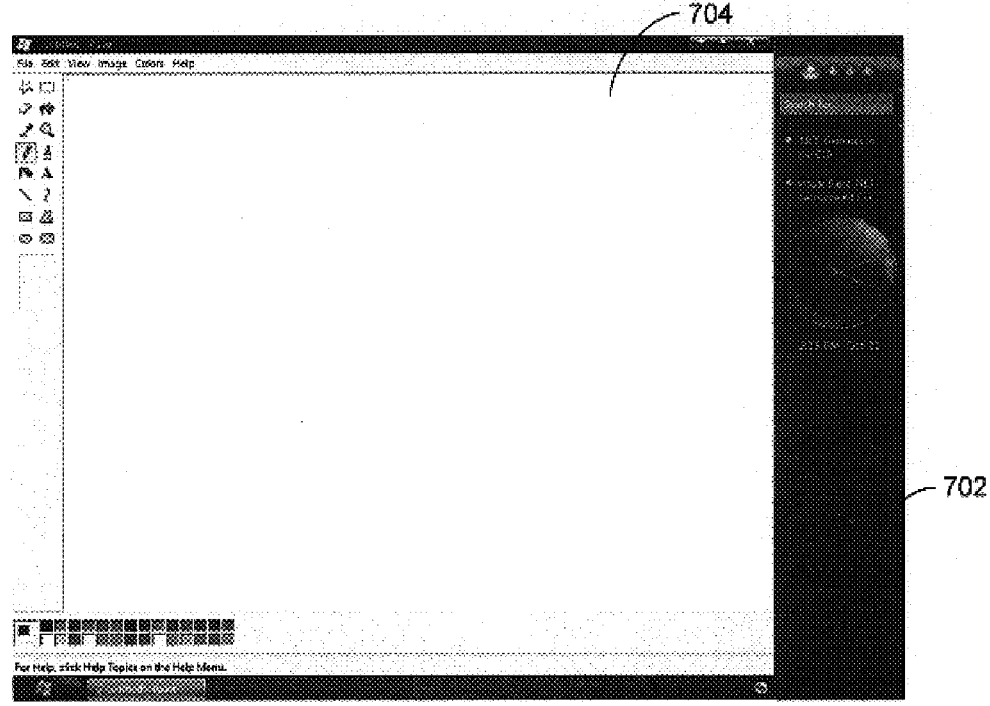
FIG. 7 is an image of a display screen showing the window of FIG. 6 maximized within the display screen, where all but the title bar of the window's frame has been eliminated, and where the title bar, task bar, and side bar have been de-emphasized so as to not draw the attention of the user away from the content of the window.

It is also noted that the particular peripheral GUI elements discussed above are not the only ones that can be de-emphasized when a window is maximized. Any such elements can be treated in the same manner. For example, referring to FIG. 6, an example of a viewing space 600 containing a so-called side bar GUI feature 602 is shown in its default appearance exhibited when the window 604 is shown in its restored size. Note that while already somewhat unobtrusive, the side bar 602 appears to be at least partially transparent and still tends to catch the eye. FIG. 7 shows the same side bar feature 702 in a de-emphasized state after the window 704 has been maximized. Note here that the background has been made opaque and black thereby making the feature 702 less noticeable to the user. As an alternative way of handling the side bar when the window is maximized, it could simply be removed and the window expanded to cover that area on the display screen.

Figure 8:
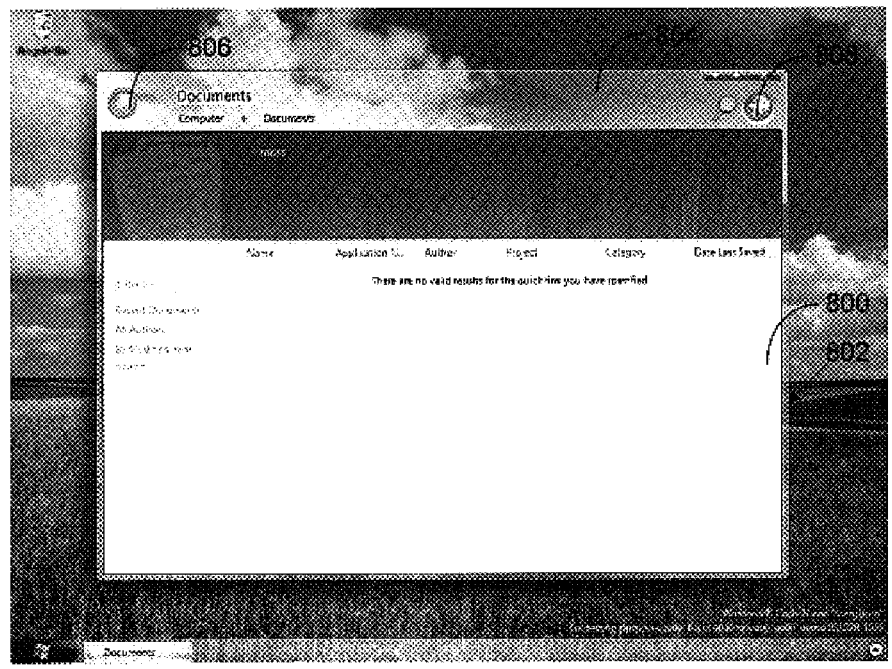
FIG. 8 is an image of a display screen showing a different window in its restored size, where the frame of the window and the task bar have the appearance of being somewhat transparent, and where the title bar of the frame has a completely different size and configuration from that of the window in FIGS. 4 and 5.
Figure 9:
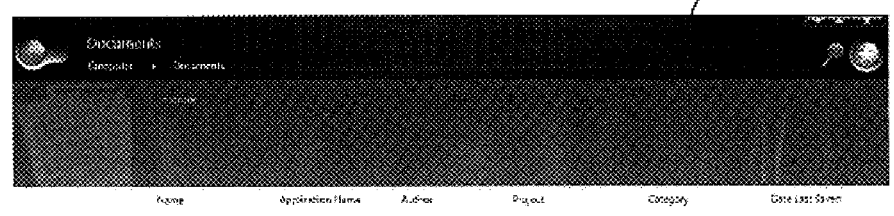
FIG. 9 is an image of a display screen showing the window of FIG. 8 maximized within the display screen, where all but the title bar of the window's frame has been eliminated, and where the title bar and the task bar have been de-emphasized so as to not draw the attention of the user away from the content of the window.
Figure 9:

Still further it is noted that the particular configuration and size of the peripheral GUI elements shown in the examples described above can be vary without affecting the scope of the present system and process. For example, FIG. 8 shows a window 800 exhibiting a frame 802 having the previously described eye-catching, at least partially transparent appearance, while in its default or restored size. Notice that the title bar 804 of this window is much larger than that depicted in the window 402 of FIG. 4. In addition, there are two prominent control buttons 806, 808 at either side of the title bar 804. Compare this to the same window 900 after being maximized as shown in FIG. 9. In this figure the title bar 902 has been changed to exhibit an opaque black background, and the text and control buttons have been de-emphasized in the manner described previously. Notice that even though the title bar 902 has a completely different size and configuration when compared to the title bar 402 of FIG. 4, it too no longer draws the attention of a viewer as much.

3.0 Alternate Configurations

While the invention has been described in detail by specific reference to the foregoing embodiments thereof, it is understood that variations and modifications may be made without departing from the true spirit and scope of the invention. For example, in the foregoing description of the present invention all the peripheral GUI elements were de-emphasized when a window was maximized. However, this need not be the case. Rather, just one or some number less than all of these elements can be de-emphasized as described above, thereby leaving the remaining peripheral GUI elements to exhibit their original default appearance.

It is noted that the present system and process is particularly advantageous when employed with the aforementioned default appearance involving the a degree of transparency. This is because whatever is displayed underneath will show through the peripheral GUI elements to some degree. Thus not only might the screen's background image show through, but also other windows, icons, control buttons, and so on. In addition, if these underlying items change appearance in any way, this would show through as well making it appear to the user that something is moving. It might even be that something is actually moving if an underlying item involves the use of an animation, or video playback, or something similar. This kind of variety and possible motion in the items that can be seen through the peripheral GUI elements can be particularly distracting to a user tying to concentrate on the content of a window-more so than perhaps the conventional brightly colored and textured appearance often given these types of peripheral GUI elements not employing an at least partially transparent look. However, while the examples of the peripheral GUI elements described above all exhibited a degree of transparency as a default appearance, this need not be the case. In less preferred embodiments of the present system and process, any default appearance can be employed, including the use of different colors, patterns, textures, or even animations for example. The invention is not intended to be limited to merely changing an at least partially transparent default appearance to a de-emphasized one when a window displayed on a computer device's display screen is maximized. Rather, in general any attention getting appearance scheme can be converted to a de-emphasized appearance when the window is maximized with the same advantageous results.

Wherefore, what is claimed is:

1. In a computer system having a user interface including a display with a display screen, a multiple-mode window presentation process comprising process actions for:
   displaying one or more peripheral graphic user interface (GUI) elements in a first appearance mode having an appearance that is designed to not distract a user from the content of the window when a window displayed on the display screen is maximized, comprising displaying a background of said one or more peripheral GUI elements in a color that reduces the distractive effect of the elements on a user in comparison to the background color employed when displaying these same elements in a second appearance mode; and
   displaying one or more of the peripheral GUI elements in the second appearance mode when the window is displayed with a less-than-maximized size within the display screen, wherein the second appearance mode is substantially different from the first appearance mode.

2. The process of claim 1, wherein said color that reduces the distractive effect of said one or more peripheral GUI elements on the user is black.

3. In a computer system having a user interface including a display with a display screen, a multiple-mode window presentation process comprising process actions for:
   displaying one or more peripheral graphic user interface (GUI) elements in a first appearance mode having an appearance that is designed to not distract a user from the content of the window when a window displayed on the display screen is maximized comprising displaying a peripheral GUI element comprising lettering and/or graphic items with said lettering and/or graphic items in a color that reduces the distractive effect of the element on a user in comparison to the color employed when displaying the same lettering and/or graphic items in a second appearance mode; and
   displaying one or more of the peripheral GUI elements in the second appearance mode when the window is displayed with a less-than-maximized size within the display screen, wherein the second appearance mode is substantially different from the first appearance mode.

4. The process of claim 3, wherein said color of the lettering and/or graphic items that reduces the distractive effect of the peripheral GUI element on the user is white.

5. In a computer system having a user interface including a display with a display screen, a multiple-mode window presentation process comprising process actions for:
   displaying one or more peripheral graphic user interface (GUI) elements in a first appearance mode having an appearance that is designed to not distract a user from the content of the window when a window displayed on the display screen is maximized, comprising displaying a peripheral GUI element comprising lettering and/or graphic items with said lettering and/or graphic items dimmed such that the brightness of said items is lower in comparison to the color employed when displaying the same lettering and/or graphic items in a second appearance mode; and
   displaying one or more of the peripheral GUI elements in the second appearance mode when the window is displayed with a less-than-maximized size within the display screen, wherein the second appearance mode is substantially different from the first appearance mode.

6. In a computer system having a user interface including a display with a display screen, a multiple-mode window presentation process comprising process actions for:
   displaying one or more peripheral graphic user interface (GUI) elements in a first appearance mode having an appearance that is designed to not distract a user from the content of the window when a window displayed on the display screen is maximized, comprising displaying a peripheral GUI element comprising control buttons and/or indicator bars with said control buttons and/or indicator bars in a color that reduces the distractive effect of the element on a user in comparison to the color employed when displaying the same control buttons and/or indicator bars in a second appearance mode; and
   displaying one or more of the peripheral GUI elements in the second appearance mode when the window is displayed with a less-than-maximized size within the display screen, wherein the second appearance mode is substantially different from the first appearance mode.

7. The process of claim 6, wherein said color of the control buttons and/or indicator bars that reduces the distractive effect of the peripheral GUI element on the user is gray.

8. In a computer system having a user interface including a display with a display screen, a multiple-mode window presentation process comprising process actions for:
   displaying one or more peripheral graphic user interface (GUI) elements in a first appearance mode when a window displayed on the display screen is maximized, wherein said one or more peripheral GUI elements comprises a frame displayed around the periphery of the window having a title bar disposed across the top of the window, and wherein the displaying said one or more peripheral GUI elements so as to have an appearance that is designed to not distract a user from the content of the window, comprises displaying just the title bar and eliminating all other portions of the frame; and
   displaying one or more of the peripheral GUI elements in a second appearance mode when the window is displayed with a less-than-maximized size within the display screen, wherein the second appearance mode is substantially different from the first appearance mode.

9. A computer-implemented process for managing the presentation of windows on the display screen of a computing device, comprising process actions for:

displaying at least one peripheral graphic user interface (GUI) element so as to exhibit an appearance designed to attract the attention of a user when a window displayed on the display screen is displayed with a less-than-maximized size within the display screen, said appearance being one that makes the at least one peripheral GUI element appear to have a prescribed degree of transparency so that items displayed underneath the element can be seen through the element; and whenever the window is maximized within the display screen, displaying at least one of the peripheral GUI elements with a de-emphasized appearance which in comparison to the appearance thereof when the window is displayed with a less-than-maximized size avoids distracting users as much from the content of the window, wherein the de-emphasized appearance comprises a substantially opaque look and a black background color.

10. A window presentation management system, comprising:
   a general purpose computing device comprising a display screen; and
   a computer program comprising program modules executable by the computing device, wherein the computing device is directed by the program modules of the computer program to, display at least one peripheral graphic user interface (GUI) element so as to exhibit an appearance designed to attract the attention of a user when a window also displayed on the display screen is displayed with a less-than-maximized size within the display screen, wherein said appearance comprises exhibiting a prescribed degree of transparency such that items displayed underneath the at least one element can be seen through the element to an extent dictated by the degree of transparency, display one or more of the peripheral GUI elements so as to exhibit a non-distracting appearance when the window is maximized, thereby concentrating a user's attention on the content of the window, wherein said non-distracting appearance comprises exhibiting a degree of transparency that is at least substantially reduced in comparison to said prescribed degree of transparency.

* * * * *